(12) United States Patent
Chan et al.

(10) Patent No.: US 6,738,879 B2
(45) Date of Patent: May 18, 2004

(54) ADVANCED TECHNOLOGY ATTACHMENT COMPATIBLE DISC DRIVE WRITE PROTECTION SCHEME

(75) Inventors: Wesley W. Chan, Singapore (SG); Patrick T. Wong, Singapore (SG); YongPeng Chng, Singapore (SG); Kareen C. Ee, Singapore (SG); EngKuan Ooi, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 68 days.

(21) Appl. No.: 09/860,982

(22) Filed: May 18, 2001

(65) Prior Publication Data

US 2002/0007437 A1 Jan. 17, 2002

Related U.S. Application Data

(60) Provisional application No. 60/205,922, filed on May 22, 2000.

(51) Int. Cl.[7] .............................................. G06F 12/14
(52) U.S. Cl. ........................ 711/164; 711/111; 711/112; 711/152; 711/163
(58) Field of Search .......................... 360/60; 361/728; 713/1; 711/100, 111, 112, 163, 164, 152

(56) References Cited

U.S. PATENT DOCUMENTS

| | | | |
|---|---|---|---|
| 5,644,444 A | * | 7/1997 | Braithwaite et al. .......... 360/60 |
| 5,657,470 A | * | 8/1997 | Fisherman et al. .......... 711/153 |
| 5,751,998 A | | 5/1998 | Wunderlich et al. ........ 714/163 |
| 5,949,601 A | * | 9/1999 | Braithwaite et al. .......... 360/60 |
| 5,960,460 A | * | 9/1999 | Marasco et al. ............ 711/100 |
| 6,058,402 A | | 5/2000 | Feiken ........................ 708/144 |
| 6,101,593 A | * | 8/2000 | Feldman ..................... 361/728 |
| 6,104,561 A | * | 8/2000 | Braithwaite et al. .......... 360/60 |
| 6,401,198 B1 | * | 6/2002 | Harmer et al. ................. 713/1 |

FOREIGN PATENT DOCUMENTS

| | | |
|---|---|---|
| JP | 10133951 | 5/1998 |
| WO | WO 93/09495 | 5/1993 |

* cited by examiner

*Primary Examiner*—T Nguyen
(74) *Attorney, Agent, or Firm*—Westman, Champlin & Kelly

(57) ABSTRACT

A disc drive storage system and device for use with a host computer is provided in which information contained on the disc drive can be write protected with an ATA compatible write protection scheme. The system includes at least one rotatable disc having a disc surface with a plurality of physical memory locations referenced by the host computer through logical block addresses. The physical memory locations include data storage locations and attribute storage locations that store protection status information corresponding to the data storage locations. A disc controller receives write protection commands that are compatible with an ATA data exchange protocol from the host. These write protection commands relate to the write protection status information of at least one logical block address. The controller executes the write protection commands to thereby implement a write protection scheme compatible with the ATA data exchange protocol.

15 Claims, 3 Drawing Sheets

ADVANCED TECHNOLOGY ATTACHMENT COMPATIBLE DISC DRIVE WRITE PROTECTION SCHEME

CROSS-REFERENCE TO RELATED APPLICATION

This application claims priority to U.S. Provisional Application No. 60/205,922, filed May 22, 2000, and entitled "DRIVE WITH BUILD-IN WRITE PROTECTION CAPABILITY".

FIELD OF THE INVENTION

The present invention relates to data storage systems and, in particular, to a disc drive write protection scheme that conforms to Advanced Technology Attachment (ATA) standards.

BACKGROUND OF THE INVENTION

Mass storage devices are one of many components of modern computers. One type of mass storage device is the fixed disc drive. Such drives are used to store vast amounts of information relating to operating systems, applications, and user data. Some of this information is critical to the functioning of the host system in which the disc drive operates. In addition, the recent dramatic decrease in the cost of disc drives has resulted in them being used in many non-conventional applications, such as, audio/video applications, internet set-top boxes, gaming stations, etc. All these applications require special software to be pre-loaded onto a disc. If application software or other critical information is intentionally or unintentionally overwritten, significant losses could occur. Thus, these applications require more sophisticated write protection security features.

Advances in disc drive technology have made them more interoperable and mobile. A standard ATA data exchange interface developed by the National Committee for Information Technology Standards is utilized as the disk drive interface on most personal and mobile computers today. Disc drive mobility and interoperability has increased the need for data security. A variety of read/write protection applications already exist in the disc drive industry. Network and operating system applications are the most common, for example, typing a password in a dialog box, when prompted, to gain access to a particular application or update access to a particular database. However, most of these applications are implemented by separate software and not directly on the disc drive prior to its installation.

Techniques for read/write protection also include the use of reserved sectors on a disc cartridge or drive to store protection status information relating to other disc locations which are to be read/write protected. One such technique is described in U.S. Pat. No. 6,104,561 entitled "READ/WRITE PROTECT SCHEME FOR A DISK CARTRIDGE AND DRIVE" which relates to a disc storage system with a rewritable code stored on the disc to implement read/write protection. The protection scheme described in U.S. Pat. No. 6,104,561 does not conform to ATA protocol standards and also fails to provide a command to inquire the security mode of the drive. Therefore, need arises for an ATA compatible write protection scheme that can write protect portions of the disc or the entire disc.

The present invention addresses these problems, and offers other advantages over the prior art.

SUMMARY OF THE INVENTION

The present invention relates to data storage systems that include an ATA compatible write protection scheme that can write protect portions of the disc or the entire disc, thereby solving the above-mentioned problem.

A disc drive storage system and device for use with a host computer is provided in which information contained on the disc drive can be write protected with an ATA compatible write protection scheme. The system includes at least one rotatable disc having a disc surface with a plurality of physical memory locations. These physical memory locations are referenced by the host computer through logical block addresses. The physical memory locations include data storage locations and attribute storage locations. The attribute storage locations store protection status information corresponding to the data storage locations. Protection status information indicates whether the data storage locations can be written to. A spindle motor is coupled to the disc. A head reads information from the physical memory locations and writes information to the physical memory locations. An actuator supports the head over the disc surface. A disc controller which is coupled to the spindle motor and the actuator controls operation of the disc. In addition, the controller exchanges information with the host computer through an ATA data exchange protocol. The controller receives write protection commands that are compatible with the ATA data exchange protocol from the host. These write protection commands relate to the write protection status information of at least one logical block address. The controller executes the write protection commands to thereby implement a write protection scheme compatible with the ATA data exchange protocol. In addition, a method of write protecting a disc drive with an ATA compatible write protection scheme is provided.

These and various other features as well as advantages which characterize the present invention will be apparent upon reading of the following detailed description and review of the associated drawings.

DETAILED DESCRIPTION OF ILLUSTRATIVE EMBODIMENTS

Figure 1:
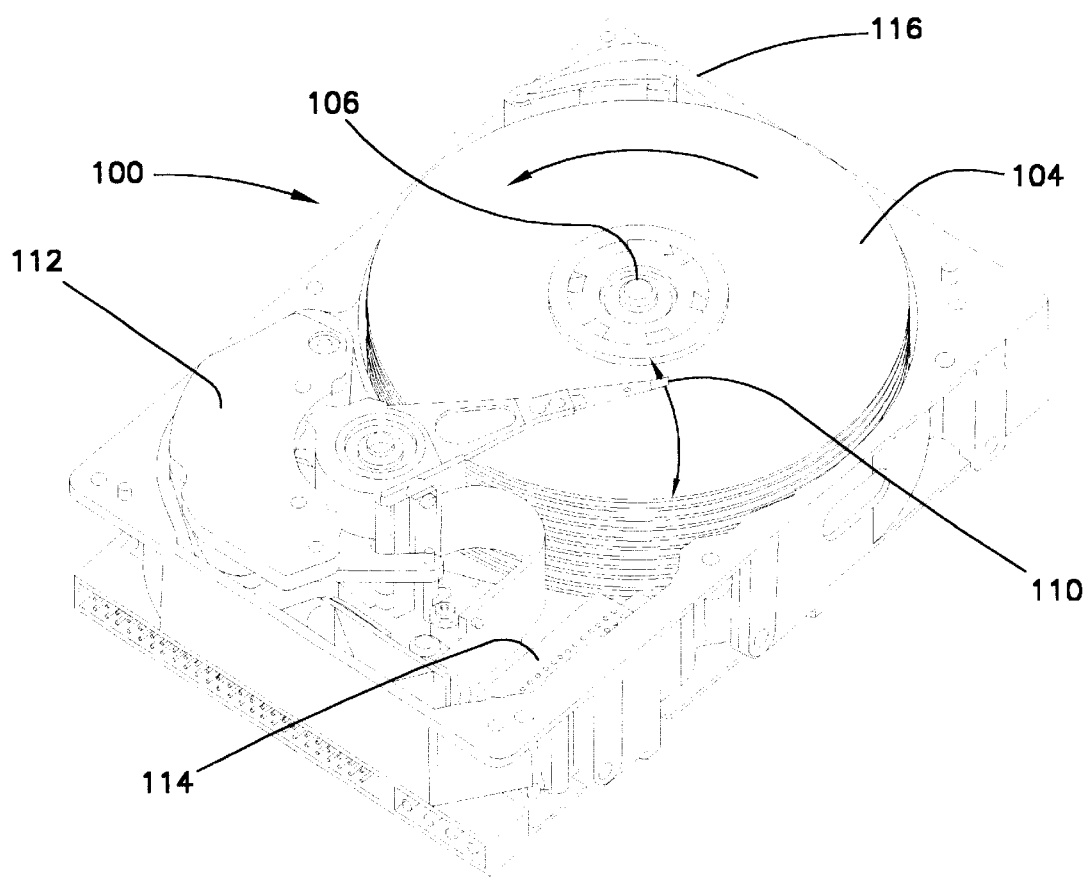
FIGS. 1 and 2 are diagrammatic and system block views, respectively, of an exemplary fixed disc drive for which embodiments of the present invention are useful.
Figure 2:
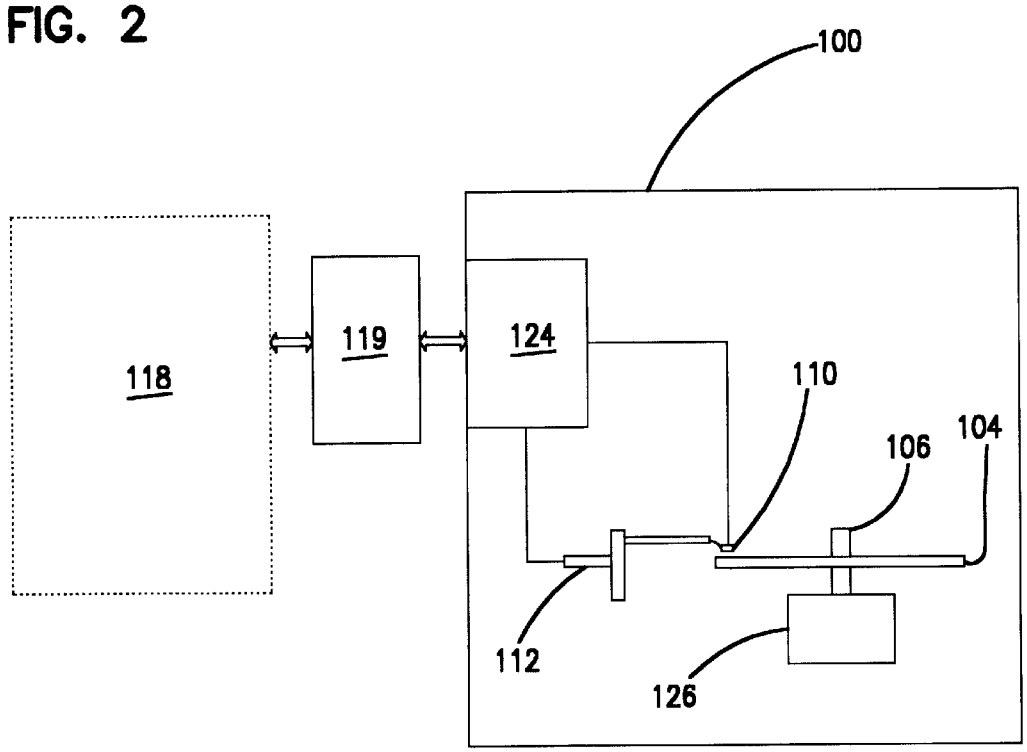

Referring now to FIG. 1, a diagrammatic view of disc drive 100 with which the present invention is useful is shown. Disc drive 100 is adapted to couple to a computer 118 (shown in FIG. 2). When disc drive 100 is coupled to computer 118, computer 118 transfers data to and reads data from disc drive 100 via ATA interface 119 (shown in FIG. 2) which typically includes hardware and software that complies with ATA protocol specifications. Disc drive 100 includes discs 104, spindle 106, spindle motor 126 (shown in FIG. 2), transducer head 110, actuator 112, and board electronics 114. Board electronics 114 include disc controller 124 (shown in FIG. 2) which is compatible with ATA interface 119.

Discs 104 are fixed about spindle 106, which is coupled to spindle motor 126 such that energization of spindle motor 126 causes spindle 106 and discs 104 to rotate. When discs 104 rotate, heads 110 fly above/below discs 104 on thin films of air or liquid that carry heads 110 for communicating with the respective disc surface. Several alternative types of heads can be used, such as magnetic or optical heads. Actuator 112 is coupled to controller 124 and is adapted to move heads 110 relative to the surfaces of discs 104 in response to an actuation signal from controller 124.

Typically, each disc surface includes a plurality of radially concentric tracks (not shown) to aid in location and readback of data. Each track is further broken down into a plurality of sectors, which further aid in location of a particular bit of information. One method of addressing these sectors is a linear addressing scheme called logical block addressing (LBA). For example, in a 540 Meg drive, LBA 0 corresponds to sector 1 of head 0, cylinder 0, and successively proceeds along to the last physical sector on the drive which would be LBA 1,065,456. Certain sectors (attribute storage locations) on the disc surface are reserved for storing protection status information corresponding to other sectors (data storage locations) on the disc. The protection status information indicates whether the data storage locations can be written to. Typically, attribute storage locations are not addressed by the LBA scheme and may be located in reserved cylinders of the discs.

Figure 3:
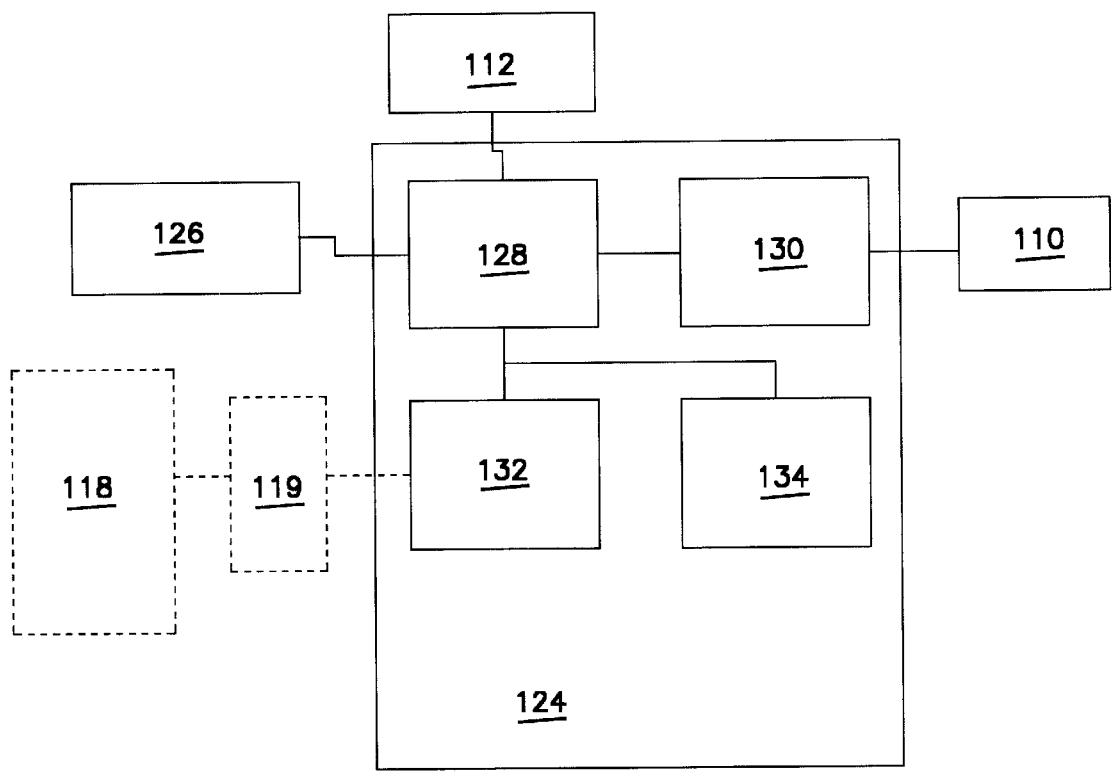
FIG. 3 is a block diagram of a disc controller in accordance with an embodiment of the present invention.

Referring now to FIG. 3, a block diagram of disc controller 124 in accordance with an embodiment of the present invention is shown. FIG. 3 shows disc controller 124 coupled to computer 118 via ATA interface 119. Controller 124 is also coupled to spindle motor 126, actuator 112, and transducer head 110. FIG. 3 further shows disc controller 124 comprised of read/write circuitry 130, I/O port 132, control circuitry 128 and buffer memory 134.

Control circuitry 128 provides an energization signal to spindle motor 126, and provides an actuation signal to actuator 112. Thus, control circuitry 128 essentially controls all motion in drive 100. Control circuitry 128 also provides information which is to be written to discs 104 through read/write circuitry 130, and receives information read from discs 104 from read/write circuitry 130. Control circuitry 128 is adapted to receive a request from I/O port 132 to read information from or write information to a specific address corresponding to a physical location within drive 100. Control circuitry 128 provides appropriate actuator and energization signals to position transducer head 110 over the specified location on disc is 104. Once positioned, information is written to or read from discs 104 according to the request received from I/O port 132.

I/O port 132 is adapted to communicate commands and data between system 118 and drive 100 through ATA interface 119. How these commands are passed, interpreted, and responded to, form the basis for the ATA protocol. Typically, an ATA interface includes seven Command Block registers that the host computer's Basic Input/Output System (BIOS) or operating system's own Input/Output subsystem writes to/reads from to create an ATA command. An eighth Command Block register is used to read and write data. Table 1 below includes details of the eight ATA Command Block registers.

TABLE 1

| ATA Command Block Register | Register Description |
|---|---|
| Data | This 16-bit register is used to transfer data blocks between the device data buffer and the host. |
| Features | This register is command specific and may be used to enable/disable features of the interface. |
| Sector Count | This register contains the number of sectors of data requested to be transferred on a read or write operation between the host and the drive. |
| Sector Number | In LBA Mode this register contains Bits 0–7 of a logical block address. |
| Cylinder Low | In LBA Mode this register contains Bits 8–15 of a logical block address. |
| Cylinder High | In LBA Mode this register contains Bits 16–23 of a logical block address. |
| Drive/Head | This register contains the drive and head numbers. In addition, in LBA mode it contains bits 24–27 of a logical block address. |
| Command | This register contains the command code being sent to the drive. Command execution begins immediately after this register is written. |

Commands are issued to the drive by loading the pertinent registers in the above Command Block with the necessary parameters, and then writing the command code to the Command register.

An embodiment of the present invention includes a write protection scheme that is ATA compatible. This scheme is implemented with the help of controller 124 that is capable of receiving ATA compatible write protection commands relating to write protection status information of logical block addresses that correspond to physical memory locations on the disc surface. Controller 124 executes these commands in accordance with the controller operation described above to thereby implement the ATA compatible write protection scheme.

In an embodiment of the present invention, controller 124 is configured to receive an ATA compatible "update write protection command" from the host computer and execute this command to change protection status information of physical sectors corresponding to LBAs requested in the command. The parameters needed in the ATA Command Block registers to issue the update write protection command to the drive are shown in Table 2 below.

TABLE 2

| Register | 7 | 6 | 5 | 4 | 3 | 2 | 1 | 0 |
|---|---|---|---|---|---|---|---|---|
| Features | Bit 0 used to enable/disable write protection | | | | | | | |
| Sector Count | SPAN 7:0 | | | | | | | |
| Sector Number | LBA 7:0 | | | | | | | |
| Cylinder Low | LBA 15:8 | | | | | | | |
| Cylinder High | LBA 23:16 | | | | | | | |
| Device/Head | LBA | | | DEV | | | LBA 27:24 | |
| Command | F0h | | | | | | | |

The first row of Table 2 indicates that each register is eight bits long with individual bits 0–7. The second row of Table 2 shows the 8-bit Features register. The least significant bit (0) of the Features Register is used to enable/disable write protection of selected LBAs. The remaining bits 1–7 of the Features register are reserved. If bit 0 of the Features register has a value of "1" when the update write protection command is issued, then write protection on selected LBAs will be enabled. After the write protection status is enabled, data contained in the selected LBAs cannot be updated and any write commands directed towards these LBAs will be aborted. A value of "0" in the least significant bit (0) of the Features register when the update write protection command is issued will disable write protection of the selected LBAs only if these selected LBAs had previously been write protected. If the selected LBAs were not previously write protected, then no changes result after execution of the command.

The Sector Count register is populated with the number of LBAs (Span) for which write protection will be enabled/disabled. The Sector Number, Cylinder Low, Cylinder High and Device/Head registers is provide the LBA at which protection starts (Start LBA) and the device/head on which the Start LBA is located. Command execution begins immediately after the Command register is written. The command code for the update write protection command is F0h. The update write protection command is therefore executed immediately after F0h is written to the Command register.

The following are examples that illustrate the operation of the update write protection command have been included described above. If a first update write protection command is issued to enable write protection for LBAs 0–14, then 15 LBAs (including LBA 0 and LBA 14) are to be enabled. The least significant bit (0) of the Features contains a value of "1". The Sector Count register contains a binary equivalent of decimal 15 which is the Span of LBAs to be write protected. Since the protection begins at LBA 0, the Sector Number, Cylinder Low, Cylinder High and Device/Head registers contain LBA 0 which is the Start LBA and also include the appropriate device and head. When the Command register is populated with F0h, the first update write protection command is executed. Assuming this command is successful, a first attribute storage location is populated with the Status of "1", a Span of 15 and a Start LBA of 0. This results in LBAs 0–14 being write protected. Similarly, if a second update write protection command is successfully executed to enable LBAs 200–219, then a second attribute storage location on the disc will contain a Status of "1" a Span of 20 and a start LBA of 200 thereby indicating that LBAs 200–219 are write protected.

The number of attribute storage locations that are active (currently holding enabled protection status information) defines the current LBA protection depth of the drive. The total number of attribute storage locations reserved (capable of holding enabled protection status information) on the drive defines the maximum LBA protection depth of the drive.

During the execution of the update write protection command, disc drive 100 provides an output with the following information (shown in Table 3 below) to the host computer via ATA interface 119. The final register values depend upon the success/failure of the update write protection command.

TABLE 3

| Register | 7 | 6 | 5 | 4 | 3 | 2 | 1 | 0 |
|---|---|---|---|---|---|---|---|---|
| Error |  |  |  |  |  | ABRT |  |  |
| Sector Count |  |  |  |  |  |  |  |  |
| Sector Number |  |  |  |  |  |  |  |  |
| Cylinder Low |  |  |  |  |  |  |  |  |
| Cylinder High |  |  |  |  |  |  |  |  |
| Device/Head |  |  |  | DEV |  |  |  |  |
| Status | BSY | DRDY |  |  |  |  |  | ERR |

The above output is in accordance with standard disc drive response to ATA commands. The most significant bit of the Status register is set by controller 124 when the disc drive is busy (BSY) servicing the update write protection command. When the BSY bit is set, only the drive has access to and the host is locked out of the Command Block registers.

The second most significant bit of the Status register is the drive ready (DRDY) bit which indicates that the drive is ready to accept commands. This DRDY bit is set when the update write protection command has completed without any error. When and error occurs, the DRDY bit stays unchanged until the host reads the Status register and again indicates that the drive is ready. Therefore, when the update write protection command is completed with error, both the error (ERR) and DRDY bits of the Status register are set. In addition, when an error occurs, contents of an Error register (shown in Table 3 above) indicate that the command was aborted (ABRT).

An embodiment of the present invention also includes controller 124 configured to receive an Identify Drive ATA command, and in response to this command to provide the host computer with protection status information of the disc drive. In general, the Identify Drive ATA command enables the host to receive parameter information from the drive. Thus, in response to an Identify Drive ATA command controller 124 returns 256 words of drive related information. Of the 256 words returned, the present invention utilizes words 95 and 128 to provide protection status information to the host in terms of LBAs. For simplification, only details of words 95 and 128 returned by controller 124 in response to the Identify Drive ATA command are shown in Table 4.

TABLE 4

| Word | Bit Identification Information |
|---|---|
| 95 | 15-8 => Maximum LBAWriteProtection depth<br>7-0 => Current LBAWriteProtection depth |
| 128 | Security Status<br>15 1 = LBAWriteProtection Supported<br>14 LBAWriteProtection enabled/disabled<br>13-9 Reserved<br>8 Security level 0 = High, 1 = Maximum<br>5 1 = Enhanced security erase supported<br>4 1 = Security count expired         } ATA-5<br>3 1 = Security frozen<br>2 1 = Security locked<br>1 1 = Security enabled<br>0 1 = Security supported |

Bits 0–7 of word 95 returned by controller 124 in response to the Identify Drive ATA command provides information regarding attribute storage locations currently holding enabled protection status information (current LBAWriteProtection depth) and bits 8–15 indicate the maximum attribute storage locations that can be used in the write protection scheme (maximum LBAWriteProtection depth). Word 128 provides general information regarding the write protection scheme. Bit 15 of word 128 indicates whether write protection is supported by the disc drive. A value of "1" in bit 15 of word 128 indicates that the drive supports the write protection scheme and a value of "0" indicates that the scheme is not supported. If bit 15 has a value of "1", then bit 14 indicates that the write protection scheme is enabled when it has a value of "1" and disabled when its value is "0". The remaining bits of word 128 (0–13) have standard information in accordance with an ATA-5 data exchange interface protocol.

Some embodiments of the invention include a disc buffer memory into which controller 124 reads protection status information when the disc drive is booted up. The disc buffer memory is also updated after every successful execution of an update write protection command to reflect current protection status information of the disc drive. Table 5 below shows the general content of six bytes of protection status information that can be held in each disc buffer memory location.

TABLE 5

| Byte | 5 | 4 | 3 | 2 | 1 | 0 |
|---|---|---|---|---|---|---|
| Content | Status | Span | Start LBA 31:0 | | | |

The first four bytes 0–3 (first 32 bits) indicate the Start LBA, the fifth byte (4) indicates the Span of protection and the sixth byte (5) indicates the protection status of the LBAs. This information is identical to the attribute protection information stored in the attribute storage locations on the disc. The structure of an entire attribute protection sector is shown in Table 6 below.

TABLE 6

| Word | Content |
|---|---|
| 0 | Write Protect Counter (Current Write Protection Depth) |
| 1–3 | ASL (0) |
| 4–6 | ASL (1) |
| 7–9 | ASL (2) |
| 10–12 | ASL (3) |
| . . . | ASL(. . .) |
| 253–255 | ASL (84) |

Word 0 of the attribute protection sector is a write protection counter that indicates the current write protection depth which is the number of attribute locations currently holding enabled protection status information. If in accordance with the examples above, the first attribute storage location (ASL (0)) in Table 6 holds protection status information of LBAs 0–14 and the second attribute storage location (ASL (1)) holds protection status information of LBAs 200–219 and the remaining attribute protection locations (ASLs (2)–(84)) are empty, then the write protection counter will indicate a current write protection depth of 2.

The present invention can be summarized in reference to the figures, which illustrate disc drive 100 and its communication with host computer 118 via ATA interface 119. The storage device (disc drive 100) for use with a host computer 118 includes at least one rotatable disc 104 having a disc surface with a plurality of physical memory locations referenced by host computer 118 through logical block addresses. The physical memory locations including data storage locations and attribute storage locations. The attribute storage locations store protection status information corresponding to data storage locations. Protection status information indicates whether the data storage locations can be written to. A spindle motor is coupled to disc 104. A head 110 reads information from the physical memory locations and writes information to the physical memory locations. An actuator 112 supports head 110 over the disc surface. A disc controller 124 is coupled to spindle motor 126 and actuator 112. Controller 124 controls operation of disc 104. Controller 124 exchanges information with host computer 118 through an ATA data exchange protocol. Controller 124 receives write protection commands compatible with the ATA data exchange protocol from host computer 118. These write protection commands relate to write protection status information of at least one logical block address. Controller 124 executes these write protection commands to thereby implement a write protection scheme compatible with the ATA data exchange protocol.

In some embodiments of the present invention, controller 124 receives an update write protection command compatible with ATA data exchange protocol from host computer 118 and in response changes the protection status information of at least one logical block address.

In some embodiments of the present invention, controller 124 receives an Identify Drive ATA command from host computer 118 and in response provides protection status information to host computer 118.

In some embodiments of the present invention, controller 124 reads protection status information from the attribute storage locations into disc buffer memory 134 upon boot-up. Also, controller 124 can update disc buffer memory 134 to reflect changes made to protection status information.

In some embodiments of the present invention, controller 124 responds to write protection commands from host computer 118 only if provided with an appropriate password. Passwords may be add for each protected LBA. Also, a password system that allows for the use of different groups of passwords with each group having a different access right may be implemented. In some embodiments, storage device (disc drive 100) operates in accordance with ATA-5 specifications.

Embodiments of the present invention include a method of write protecting storage device (disc drive 100) which has at least one rotatable disc 104 with a disc surface having a plurality of physical memory locations referenced by host computer 118 through logical block addresses. The physical memory locations include data storage locations and attribute storage locations. The attribute storage locations store protection status information corresponding to data storage locations. The protection status information indicates whether the data storage locations can be written to. The method includes receiving, in storage device (disc drive 100), ATA compatible write protection commands from host computer 118 relating to the write protection status information of at least one logical block address. The method also includes executing the write protection commands in storage device (disc drive 100) to implement an ATA data exchange protocol compatible write protection scheme.

In some embodiments, receiving write protection commands includes receiving an ATA compatible update write protection command from host computer 118, and executing the write protection commands includes changing the protection status information of at least one logical block address in response to receiving the ATA compatible update write protection command.

In some embodiments of the present invention, receiving write protection commands includes receiving an Identify Drive ATA command from host computer 118, and executing the write protection command includes providing protection status information to host computer 118 in response to the Identify Drive ATA command.

Some embodiments of the present invention include reading protection status information from the attribute storage locations into a disc buffer memory upon boot-up. Embodiments also include updating disc buffer memory 134 to reflect changes made to protection status information.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive write protection scheme while maintaining substantially the same functionality without departing from the scope and spirit of the present invention. Although the invention has been described in terms of a fixed, or rigid type of disc drive, the invention is applicable to any fixed or removable disc or cartridge. Even though a logical block addressing method has been used to describe the embodiments of the invention, other addressing methods for cylinders, heads and sectors can be used. In addition, although the preferred embodiment described herein is directed to an ATA compatible write protection scheme for a disc drive data storage system, it will be appreciated by those skilled in the art that the teachings of the present invention can be applied to systems like magnetic, optical or other storage systems, without departing from the scope and spirit of the present invention.

What is claimed is:

1. A storage device for use with a host computer, the device comprising:
   a disc controller configured to exchange information with the host computer through an ATA data exchange protocol, to thereby receive write protection commands compatible with the ATA data exchange protocol relating to write protection status information of at least one physical memory location, and in response executing the write protection commands to implement a write protection scheme compatible with the ATA data exchange protocol.

2. The storage device of claim 1, wherein the controller is further configured to receive an update write protection command compatible with ATA data exchange protocol from the host computer and responsively change the protection status information of at least one physical memory location.

3. The storage device of claim 1 wherein the controller is further adapted to receive an Identify Drive ATA command from the host computer and responsively provide protection status information to the host computer.

4. The storage device of claim 1, wherein the controller is further adapted to read protection status information from the attribute storage locations into a disc buffer memory upon boot-up.

5. The storage device of claim 1, wherein the controller is further adapted to update a disc buffer memory when updating the attribute storage locations to reflect changes made to protection status information.

6. The storage device of claim 1, wherein the controller is adapted to respond to write protection commands only if provided with an appropriate password.

7. The storage device of claim 1, wherein the storage device operates in accordance with ATA-5 specifications.

8. A method of write protecting a storage device used with a host computer, the method comprising the steps of:
   (a) receiving, in the storage device, ATA compatible write protection commands from the host computer relating to write protection status information of at least one physical memory location; and
   (b) executing the write protection commands in the storage device to implement an ATA data exchange protocol compatible write protection scheme.

9. The method of claim 8, wherein receiving write protection commands step (a) includes receiving an ATA compatible update write protection command from the host computer, and executing the write protection commands step (b) includes changing the protection status information of at least one physical memory location in response to receiving the ATA compatible update write protection command.

10. The method of claim 8, wherein receiving write protection commands step (a) includes receiving an Identify Drive ATA command from the host computer, and executing the write protection command commands step (b) includes providing protection status information to the host computer in response to the Identify Drive ATA command.

11. The method of claim 8, further comprising reading protection status information from the attribute storage locations into a disc buffer memory upon boot-up.

12. The method of claim 8, further comprising updating a disc buffer memory when updating the attribute storage locations to reflect changes made to protection status information.

13. The method of claim 8, further comprising responding to write protection commands only if provided with an appropriate password.

14. The method of claim 8, wherein the storage device operates in accordance with ATA-5 specifications.

15. A storage device comprising:
   means for reading data from and writing data to at least one disc of the storage device; and
   means for implementing a write protection scheme compatible with an ATA data exchange protocol.

* * * * *